(12) United States Patent
Poindexter, Jr. et al.

(10) Patent No.: US 9,216,693 B2
(45) Date of Patent: Dec. 22, 2015

(54) FATIGUE-RESISTANT FINGERS FOR CUP HOLDER

(71) Applicant: NYX, Inc., Livonia, MI (US)

(72) Inventors: Reginald Edward Poindexter, Jr., Warren, MI (US); Yuriy Tsalenko, West Bloomfield, MI (US)

(73) Assignee: NYX, Inc., Livonia, MI (US)

( * ) Notice: Subject to any disclaimer, the term of this patent is extended or adjusted under 35 U.S.C. 154(b) by 0 days.

(21) Appl. No.: 14/101,676

(22) Filed: Dec. 10, 2013

(65) Prior Publication Data

US 2014/0159413 A1 Jun. 12, 2014

Related U.S. Application Data

(60) Provisional application No. 61/735,326, filed on Dec. 10, 2012.

(51) Int. Cl.
*B60R 7/04* (2006.01)
*B60N 3/10* (2006.01)

(52) U.S. Cl.
CPC . *B60R 7/04* (2013.01); *B60N 3/101* (2013.01); *B60N 3/106* (2013.01)

(58) Field of Classification Search
CPC ........... B60R 7/04; B60N 3/101; B60N 3/106

USPC .................. 296/24.34, 37.8, 37.14; 220/737; 224/926; 248/311.2; 297/188.14
See application file for complete search history.

(56) References Cited

U.S. PATENT DOCUMENTS

| | | | |
|---|---|---|---|
| 5,149,039 A | 9/1992 | Peterson et al. | |
| 5,284,314 A | 2/1994 | Misaras et al. | |
| 6,253,975 B1 | 7/2001 | Ichioka et al. | |
| 6,361,008 B1 | 3/2002 | Gravenstreter | |
| 7,597,300 B2 * | 10/2009 | Harada | |
| 8,167,348 B2 * | 5/2012 | Fesenmyer | 296/24.34 |
| 8,360,380 B2 | 1/2013 | Soma et al. | |
| 8,783,635 B2 * | 7/2014 | Kamiya et al. | |
| 2010/0078539 A1 | 4/2010 | Erickson | |
| 2010/0090079 A1 | 4/2010 | Choi | |
| 2011/0285163 A1 * | 11/2011 | Stueber | |

* cited by examiner

*Primary Examiner* — Stephen Gordon
(74) *Attorney, Agent, or Firm* — Carlson, Gaskey & Olds, P.C.

(57) ABSTRACT

A container holder includes a housing that defines a cavity therein. A liner lines the cavity of the housing and includes a resilient portion that is laterally movable responsive to insertion of a container into the cavity, to accommodate and support containers of different sizes. At least one spring finger extends adjacent the resilient portion and opposes the lateral movement of the resilient portion.

9 Claims, 2 Drawing Sheets

US 9,216,693 B2

FATIGUE-RESISTANT FINGERS FOR CUP HOLDER

CROSS-REFERENCE TO RELATED APPLICATION

This application claims priority to U.S. Provisional Ser. No. 61/735,326, which was filed Dec. 10, 2012.

BACKGROUND

This disclosure relates to container holders, such as those used in vehicles.

Container holders, such as cup or beverage holders, are widely used in vehicles. In a basic form, a container holder can simply include a cylindrical opening that can receive and hold or support a cylindrical container in a vertical position. Container that are larger than the opening will not fit, and containers that are much smaller than the opening will not be supported and will tip.

More modern container holders can include features that can receive and hold or support containers of different sizes in a vertical position. As an example, a somewhat simplistic design can include an opening that has a wide portion for holding large containers and a narrow portion for holding smaller containers. Still further, other designs can include complex spring-loaded mechanical elements that actuate to hold containers of different sizes.

SUMMARY

A container holder according to an example of the present disclosure includes a housing that defines a cavity therein. A liner lines the cavity of the housing and includes a resilient portion that is laterally movable responsive to insertion of a container into the cavity, to accommodate and support containers of different sizes. At least one spring finger extends adjacent the resilient portion and opposes the lateral movement of the resilient portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
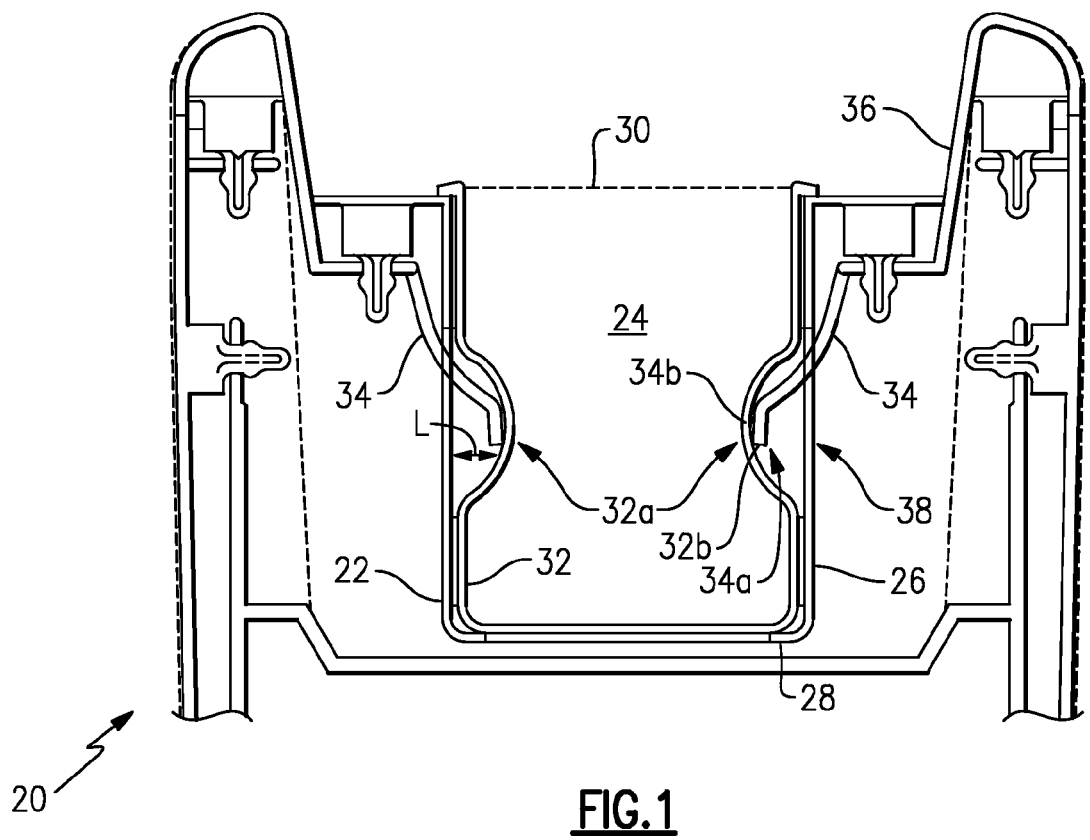
FIG. 1 illustrates an example vehicle console having a container holder.

FIG. 1 schematically illustrates a portion of an example vehicle console 10 having a container holder 20. In a vehicle, the container holder 20 is oriented to hold and support a container in a vertical or near vertical position, such as to reduce tipping. Although the container holder 20 is described herein in the context of the vehicle console 10 and a vehicle, the examples herein are not limited to vehicles or to holding or supporting containers, cups or beverages. The present disclosure and examples will also be of benefit in other applications, for holding or supporting other kinds of objects in a desired position.

Container holders can include spring-loaded mechanical elements that actuate to hold containers of different sizes. Incorporation of spring-loaded mechanical elements into a vehicle console and container holder assembly requires additional manufacturing tooling and assembly resources, thus leading to increased piece costs. Further, spring-loaded mechanical elements tend to be bulky and thus take up design space that could otherwise be used for other purposes. The container holder 20 disclosed herein provides a relatively simple design that can accommodate and support containers or other objects of differing sizes and also resist fatigue that could otherwise reduce longevity.

In the illustrated example, the console 10 includes a console body 12 that carries the container holder 20. The container holder 20 includes a housing 22 that has a cavity 24 therein. In this example, the housing 22 has a cup shape and includes sidewalls 26, a bottom wall 28 that joins the sidewalls 26, and an open top 30 (dashed line). A container can be received through the open top 30 into the cavity 24 of the container holder 20.

A liner 32 lines the cavity 24 of the housing 22. In this example, the liner 32 conforms to the cup shape of the housing 22, but includes a resilient portion 32a in the form of a hollow protrusion that extends into the cavity 24. The resilient portion 32a is laterally movable (along direction L represented in FIG. 1) responsive to insertion of a container into the cavity 24 in order to accommodate and support containers of different sizes.

In one example, the liner 32, or at least the resilient portion 32a of the liner 32, is formed of and includes a resilient material. Example resilient materials can include elastomeric materials. The resilient portion 32a can consist exclusively of elastomeric material, or alternatively be incorporated in a resilient composite with other materials, such as a thermoplastic olefin.

Over time, many types of resilient materials can fatigue or creep, which can result in permanent deformation from an original design geometry and reduced functionality or ability to accommodate or support different sized containers. For example, if a container is left for a period of time in a holder such that an elastomeric element is under strain, the elastomeric element, especially at relatively high temperatures, can permanently deform.

The container holder 20 includes at least one spring finger 34 that extends adjacent the resilient portion 32a and opposes the lateral movement, to help maintain the design shape of the resilient portion 32a. In the illustrated example, a plurality of the spring fingers 34 can be circumferentially arranged around the liner 32 and housing 22. The spring finger or fingers 34 are relatively rigid in comparison to the resilient portions 32a. For example, the spring finger or fingers 34 are formed of or include a more rigid material that the material of the resilient portions 32a. As an example, the spring finger or fingers 34 are formed of a thermoplastic material. Therefore, even if a container is left in the cavity 24 at an elevated temperature, the more rigid spring finger or fingers 34 urge the resilient portions 32a inwardly into the cavity 24 back toward the original design shape of the resilient portions 32a (FIG. 1).

Figure 2:
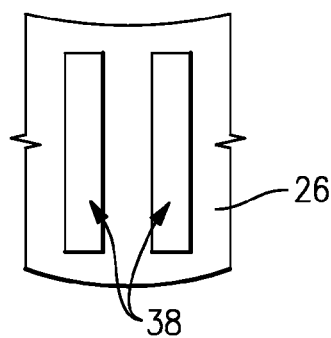
FIG. 2 illustrates example open windows in a housing of the container holder of FIG. 1.

In the illustrated example, the spring finger or fingers 34 are separate and distinct from the housing 22. In this regard, the spring finger or fingers 34 extend from a panel 36 of the console body 12 and through open windows 38 in the sidewalls 26 of the housing 22 (see also an isolated view of a portion of the housing 22 in FIG. 2).

In the illustrated example, the spring finger or fingers 34 include a free end portion 34a, an attached base 34b secured to the panel 36, and a body 34c joining the free end portion 34a and the base 34b. The spring finger 34 is thus cantilevered such that the body 34c slopes from the base 34b to the free end portion 34a and towards the bottom wall 28. The sloped, cantilevered geometry permits the spring finger or fingers 34 to extend through the open windows 38 and to have some resilience to return the resilient portions 32a to the original design shape.

In this example, the free end portion 34a contacts the outside surface of the resilient portions 32a of the liner 32. To facilitate proper interaction between the finger 34 and the resilient portion 32a, the free end portion 34a can have a geometry that compliments the geometry of the resilient portion 32a. For example, the free end portion 34a includes a contact surface 34d that is contoured to compliment the contour of an outer surface 32b of the resilient portions 32a. The free end portions 34a thus more uniformly support the resilient portions 32a and ensure that the spring finger or fingers 34 can fully or substantially fully return the resilient portions 32a to the original design shape.

Figure 3:
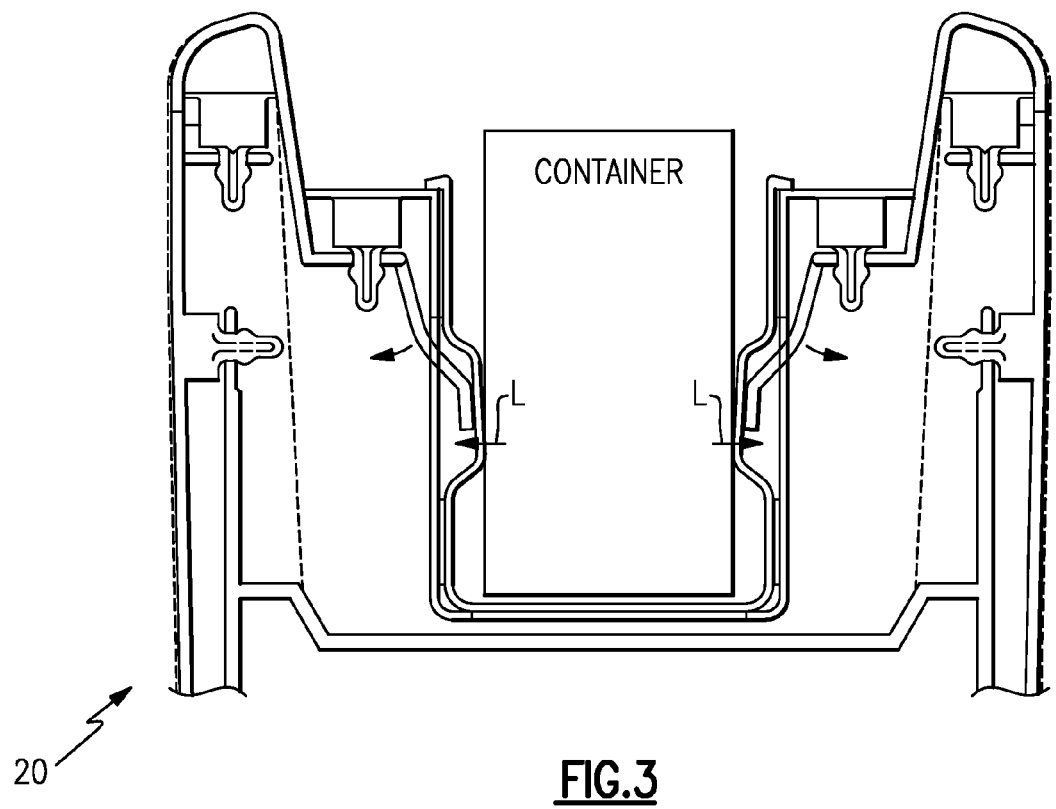
FIG. 3 illustrates the container holder of FIG. 1 with a container inserted.

While FIG. 1 illustrates the container holder 20 in a "relaxed" position with no container inserted, FIG. 3 shows the container holder 20 with a container inserted into the cavity 24 such that the resilient portions 32a are moved laterally outwardly in conjunction with lateral outward movement of the spring finger or fingers 34. Upon removal of the container from the cavity 24, the spring finger or fingers 34 urge the resilient portions 32a inwardly into the cavity 24, toward the original design position of the resilient portions 32a (FIG. 1). Thus, even if the material of resilient portions 32a becomes damaged by fatigued or creep with the application of heat and strain, the spring finger or fingers 34 return the resilient portions 32a to the original design position to maintain the functionality of the container holder 20 for holding and supporting containers of varying sizes.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A container holder, comprising:
   a housing including a cavity therein;
   a liner lining the cavity of the housing, the liner including a resilient portion that is laterally moveable responsive to insertion of a container into the cavity, to accommodate and support containers of different sizes; and
   at least one spring finger extending adjacent the resilient portion and opposing a lateral movement of the resilient portion,
   wherein the resilient portion includes an elastomeric material, and the at least one spring finger includes a thermoplastic material and is more rigid than the resilient portion.

2. The container holder as recited in claim 1, wherein the housing includes at least one open window, the at least one spring finger extending through the open window.

3. The container holder as recited in claim 1, wherein the at least one spring finger includes a free end portion, the free end portion contacting the resilient portion of the liner.

4. The container holder as recited in claim 1, wherein the at least one spring finger includes a free end portion, the free end portion having a geometry that complements the geometry of the resilient portion of the liner.

5. The container holder as recited in claim 1, wherein the resilient portion is a hollow protrusion that extends inwardly into the cavity.

6. The container holder as recited in claim 1, wherein the housing has a cup shape including sidewalls, a bottom wall joining the sidewalls, and an open top.

7. The container holder as recited in claim 1, wherein the at least one spring finger is separate and distinct from the housing.

8. The container holder as recited in claim 1, wherein the housing includes sidewalls, a bottom wall joining the sidewalls, and an open top, the at least one spring finger including an attached base, a free end portion, and a body joining the base and the end portion, the body sloping from the base to the free end and toward the bottom wall.

9. A vehicle console comprising:
   a console body;
   a container holder carried by the console body, the container holder including a housing having a cavity therein, a liner lining the cavity of the housing, the liner including a resilient portion that is laterally moveable responsive to insertion of a container into the cavity, to accommodate and support containers of different sizes, and at least one spring finger extending adjacent the resilient portion and opposing a lateral movement of the resilient portion,
   wherein the at least one spring finger includes a free end portion, and the free end portion includes a contact surface that is contoured to complement an outer surface of the resilient portion, wherein the at least one spring finger is more rigid than the resilient portion, wherein the resilient portion includes an elastomeric material, and the at least one spring finger includes a thermoplastic material.

* * * * *

UNITED STATES PATENT AND TRADEMARK OFFICE
CERTIFICATE OF CORRECTION

PATENT NO. : 9,216,693 B2  
APPLICATION NO. : 14/101676  
DATED : December 22, 2015  
INVENTOR(S) : Reginald Edward Poindexter et al.

It is certified that error appears in the above-identified patent and that said Letters Patent is hereby corrected as shown below:

IN THE CLAIMS:

In claim 8, column 4, line 33: after "and the" insert --free--

In claim 8, column 4, line 34: after "end" insert --portion--

Signed and Sealed this
Twelfth Day of April, 2016

Michelle K. Lee
*Director of the United States Patent and Trademark Office*